United States Patent [19]

Chatterjee et al.

[11] Patent Number: 5,688,731
[45] Date of Patent: Nov. 18, 1997

[54] CERAMIC ARTICLES CONTAINING DOPED ZIRCONIA HAVING HIGH ELECTRICAL CONDUCTIVITY

[75] Inventors: Dilip K. Chatterjee, Rochester; Gregory S. Jarrold, Henrietta; Syamal K. Ghosh, Rochester, all of N.Y.

[73] Assignee: Eastman Kodak Company, Rochester, N.Y.

[21] Appl. No.: 746,536

[22] Filed: Nov. 13, 1996

[51] Int. Cl.$^6$ ............................. C04B 35/48; C04B 35/58
[52] U.S. Cl. ............................. 501/96; 501/98; 501/103; 501/105; 252/520
[58] Field of Search ............................. 501/96, 98, 103, 501/104, 105; 252/520

[56] References Cited

U.S. PATENT DOCUMENTS

| | | | |
|---|---|---|---|
| 4,528,121 | 7/1985 | Matsushita et al. | 252/516 |
| 4,751,207 | 6/1988 | Manning | 501/104 |
| 4,820,667 | 4/1989 | Tsunekawa et al. | 501/104 |
| 5,045,512 | 9/1991 | Lange et al. | 501/96 |
| 5,177,037 | 1/1993 | Schuldies | 51/309 |
| 5,183,610 | 2/1993 | Brog et al. | 264/56 |
| 5,290,332 | 3/1994 | Chatterjee et al. | 65/18.1 |
| 5,336,282 | 8/1994 | Ghosh et al. | 51/309 |
| 5,358,913 | 10/1994 | Chatterjee et al. | 501/103 |
| 5,411,690 | 5/1995 | Ghosh et al. | 264/63 |
| 5,525,560 | 6/1996 | Yamazaki et al. | 501/103 |

FOREIGN PATENT DOCUMENTS 59-227771 12/1984 Japan.

*Primary Examiner*—Mark L. Bell
*Assistant Examiner*—Louis M. Troilo
*Attorney, Agent, or Firm*—Arthur H. Rosenstein

[57] ABSTRACT

Electrically conductive ceramic composite articles comprising tetragonal zirconia or a composite of zirconia-alumina and zirconium diboride.

11 Claims, 3 Drawing Sheets

CERAMIC ARTICLES CONTAINING DOPED ZIRCONIA HAVING HIGH ELECTRICAL CONDUCTIVITY

FIELD OF THE INVENTION

This pertains to ceramic articles and more particularly to articles comprising electrically conductive tetragonal zirconia for use as a tool or a machine component.

BACKGROUND OF THE INVENTION

In the production of materials such as photographic films and papers; cutting tools, such as perforators and slitter knives, require impact resistance to eliminate catastrophic failures and corrosion, and wear and abrasion resistance to improve service life and productivity. Conventional cutting tool materials, such as high speed steels, hardenable stainless steels, and cemented tungsten carbides, meet some of these requirements but have the limitation of requiring frequent maintenance due to wear, abrasion and corrosion.

Ceramic materials such as tetragonal zirconia polycrystals (TZP) and more specifically a doped tetragonal zirconia polycrystals (Y-TZP) offer many advantages over conventional materials and are therefore used in cutting, perforating, slitting and chopping of photographic film and paper webs. Y-TZP is one of the toughest ceramics known. The toughness is achieved at the expense of hardness and strength.

It is known that impact beating tools or parts have a longer service life and better performance if made with a core of a tough material and a surface or shell of a hard material. Common examples include nitrided or case carburized metal tool parts, camshafts and the like. A surface treatment such as carburizing or nitriding is used to form a stable hard phase over a tougher core. The phase changes are dependent upon the reactivity of the parent metallic material with a reacting material, for example, a carbon or nitrogen species. In ceramics, inherent chemical inertness has impeded the preparation of comparable composite structures. Ceramic articles having surface areas with stress induced phase changes are very easy to achieve, since such phase changes occur as a result of abrasion on working surfaces during use. With Y-TZP, stress induces transformation from a tough, but not very hard tetragonal phase to a harder monoclinic phase. This phase change can be utilized in different ways. Net shape tetragonal zirconia alloy articles can be produced as disclosed in U.S. Pat. No. 5,290,332. The term "net shape" is defined as a ceramic article that is dimensionally true after sintering and therefore does not necessitate further machining prior to use in its intended working environment. During use, working surfaces of a net shape article will be subject to phase transformation. Suitable tolerances will permit abrasion losses at working surfaces, prior to phase transformation, to be ignored. Alternatively, phase transformation to monoclinic zirconia can be induced by an abrading process, such as grinding or lapping, during fabrication of the tool. Neither approach is straight-forward in that two variables, the dimensions of the article and its phase characteristics are changing simultaneously. Both approaches are extremely problematic when attempted with an article having a complex geometry with a tight tolerence.

An alternative approach is taught by U.S. Pat. No. 5,358,913; which is hereby incorporated herein by reference. In that approach, a tetragonal zirconia alloy article, which can be near net shape, is compacted and then sintered in the presence of an MgO, CaO, $Y_2O_3$, $Sc_2O_3$, $CeO_2$, or rare earth oxide dopants and their combinations thereof to produce an article having a tetragonal core and a cubic phase shell. The dopant can be provided in a number of different forms such as a solid plate, a powder, or a layer produced by decomposition of an organo-metallic precursor film. In U.S. patent application Ser. No. 07/994,820 now abandoned in favor of Continuation-in-Part application Ser. No. 08/231,870, filed Apr. 25, 1994 and Divisional application Ser. No. 08/506,629 filed 25 Jul. 1995; a method is described for producing articles having a tetragonal zirconia alloy core and a monoclinic shell. In U.S. patent application Ser. No. 07/994,818 now abandoned in favor of a Continuation-in-Part application Ser. No. 08/400,416, filed 3 Mar. 1995, which is hereby incorporated herein by reference; a method is described for producing articles having a tetragonal zirconia alloy and alumina core and a shell of tetragonal zirconia and cubic spinel. In the core and the shell the predominant species is tetragonal zirconia. The application also teaches a method for producing articles having a core that is tetragonal zirconia alloy along with less than about 5 weight percent alumina and having a shell that is cubic phase zirconia and cubic spinel.

In U.S. Pat. No. 5,177,037 an electro-discharge machinable ceramic containing at least one non-electroconductive and one electroconductive ceramic whisker component is used. This patent does not describe tetragonal zirconia materials.

In Japanese Patent No. 83102881, stabilized zirconia of 94 to 88 mole percent blended with 6 to 12 mole percent stabilizer of MgO, CaO, $Y_2O_3$, and CeO is described as being prepared from a mixture of stabilized zirconia and zirconium diboride by hot processing or sintering under ambient atmosphere at temperatures above 1400° C.

In Japanese Patent Application No. SHO 59[1984]-227771 entitled "Highly Electroconductive Zirconia Sintered Product" by Sakada, a material for use as furnace heating elements comprises a 35–97% stabilized zirconia and 65–3% zirconium diboride.

Sakada's zirconia is not fully stabilized and has a temperature dependent transition between ionic and electronic conductance. That means it is not "essentially" or "predominately" tetragonal in crystal structure. Sakada's zirconia is essentially a stabilized or partially stabilized zirconia having a mixture of three crystal phases, e.g. cubic, tetragonal and monoclinic.

The essential requirements for a tool material or structural components made of zirconia is that the material has to be a single phase; preferably, 100% tetragonal or essentially tetragonal material which results in high fracture toughness, high ware and abrasion resistance, and it also helps in manufacturing "net-shape" articles.

Yttria ($Y_2O_3$) content in Sakada's zirconia has about 6–12 mole % stabilizer and it is believed that the multiphase material of Sakada is due to higher yttria content.

Sakada's material is hot pressed and since there is no reference to the sintering environment, it is assumed that it is in air.

The most difficult and costly aspect of producing a finished Y-TZP ceramic part is the diamond tooling that is performed to achieve the required finished dimensions. An extremely advantageous method of machining the final dimension is to electro-discharge machine. This also allows certain intricate features to be accomplished that otherwise could not be obtained via conventional machining, as well as being a no load method of machining. However, this requires that the workpiece have sufficient electrical conductivity to be successfully machined and Y-TZP and its common oxide composites are highly insulating materials at room temperature. Many attempts have been made at producing conductive ceramics to carry out electro-discharge machining of Y-TZP and its composites, typically at the expense of the desired mechanical properties.

One of the biggest drawbacks of TZP is that it is highly electrically insulating and therefore the conventional and/or wire electro-discharge machining process (EDM) can not be used to form the final shape. Many attempts have been made by others to make TZP conductive but at the expense of degradation of its mechanical properties, especially its fracture toughness. It is an object of the present invention is to make TZP and its composites electrically conductive without jeopardizing its mechanical toughness and tribological properties so that cost-effective electro-discharge machining can be performed and eliminate the expensive diamond tooling otherwise necessary. Borides, silicides and other similar conductive compounds were used as a part of the composites to enhance the electrical conductivity. Sintering was performed either in argon or nitrogen to prevent oxidation of the conductive species. It was difficult to achieve bulk conductivity without severely affecting the mechanical toughness.

SUMMARY OF THE INVENTION

This invention produces articles of Y-TZP/ZrB$_2$ and/or TZP/Al$_2$O$_3$/ZrB$_2$ composites by mixing and ball milling the components, pressing in a die and sintering in an argon atmosphere between 1300°–1700° C. It qualifies as an excellent electrically conductive ceramic composite because of its high electrical conductivity, high fracture toughness, high hardness and wear and abrasion resistance. Also, there is no chemical reaction that takes place between the materials during sintering to give a non-conductive zirconium oxyboride and/or cause grain growth, resulting in degradation of mechanical and electrical properties. Most important is the very low electrical resistance achieved which qualifies this composite as an ideal candidate for electro-discharge machining, which allows certain intricate features to be accomplished that otherwise could not be obtained by conventional diamond tool machining.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawing wherein.

DETAILED DESCRIPTION OF THE PREFERRED EMBODIMENTS

In the method of the invention, zirconia alloy or zirconia-alumina composite ceramics and zirconium diboride were mixed, milled, compacted and sintered. The sintering is done in an argon atmosphere. The resulting ceramic article of the invention has bulk constituents of predominately tetragonal zirconia and zirconium diboride. The ceramic article has a very high electrical conductivity at room temperature which allows a cost effective electro-discharge machining operation to be performed on the articles. As the composite is conductive throughout its core and exterior and has high fracture toughness, high wear and abrasion resistance and high corrosion resistance, it is particularly useful in forming tools such as cutting tools and machine components from it by electro-discharge machining.

The method of the invention utilizes particulate zirconia alloy made by mixing particulate zirconia and additional "secondary oxide" selected from: MgO, CaO, Y$_2$O$_3$, Sc$_2$O$_3$ and CeO$_2$ and other rare earth oxides (also referred to herein as "Mg-Ca-Y-Sc-rare earth oxides"). Zirconia alloys useful in the methods of the invention have a metastable tetragonal crystal structure in the temperature and pressure ranges at which the ceramic article produced will be used. For example, at temperatures up to about 200° C. and pressures up to about 1000 MPa, zirconia alloys having about, in the case of Y$_2$O$_3$, about 0.5 to about 5 mole percent; in the case of MgO, about 0.1 to about 1.0 mole percent, in the case of CeO$_2$, about 0.5 to about 15 mole percent, in the case of Sc$_2$O$_3$, about 0.5 to about 7.0 mole percent and in the case of CaO from about 0.5 to about 5 mole percent relative to the total of zirconium oxide alloy. Preferred oxides for alloying with zirconia are Y$_2$O$_3$, MgO, CaO, CeO$_2$, Sc$_2$O$_3$, rare earth oxides and combinations of these oxides. It is preferred that the zirconia powders have high purity, greater than about 99.9 percent. Specific examples of useful zirconia alloys include: tetragonal structure zirconia alloys having from about 0.5 to about 5 mole percent and preferably about 2 to about 5 mole percent Y$_2$O$_3$, or more preferably about 3 mole percent Y$_2$O$_3$. In the case of MgO, 0.1 to 1.0 mole percent provides tetragonal structure and for CeO$_2$, 0.5 to 15 mole percent provides tetragonal structure, calcium oxide of 0.5 to about 5 mole percent produces a tetragonal structure and Sc$_2$O$_3$ at about 0.5 mole percent to 7.0 mole percent produces a tetragonal structure. Examples of tetragonal structure zirconia alloys useful in the methods of the invention are disclosed in U.S. Pat. Nos. 5,290,332 and 5,411,690. Such zirconia alloys are described in those patents as being useful to provide a "net shape" ceramic article: a ceramic article that is dimensionally true after sintering and therefore does not necessitate further machining prior to use in its intended working environment.

Figure 1:
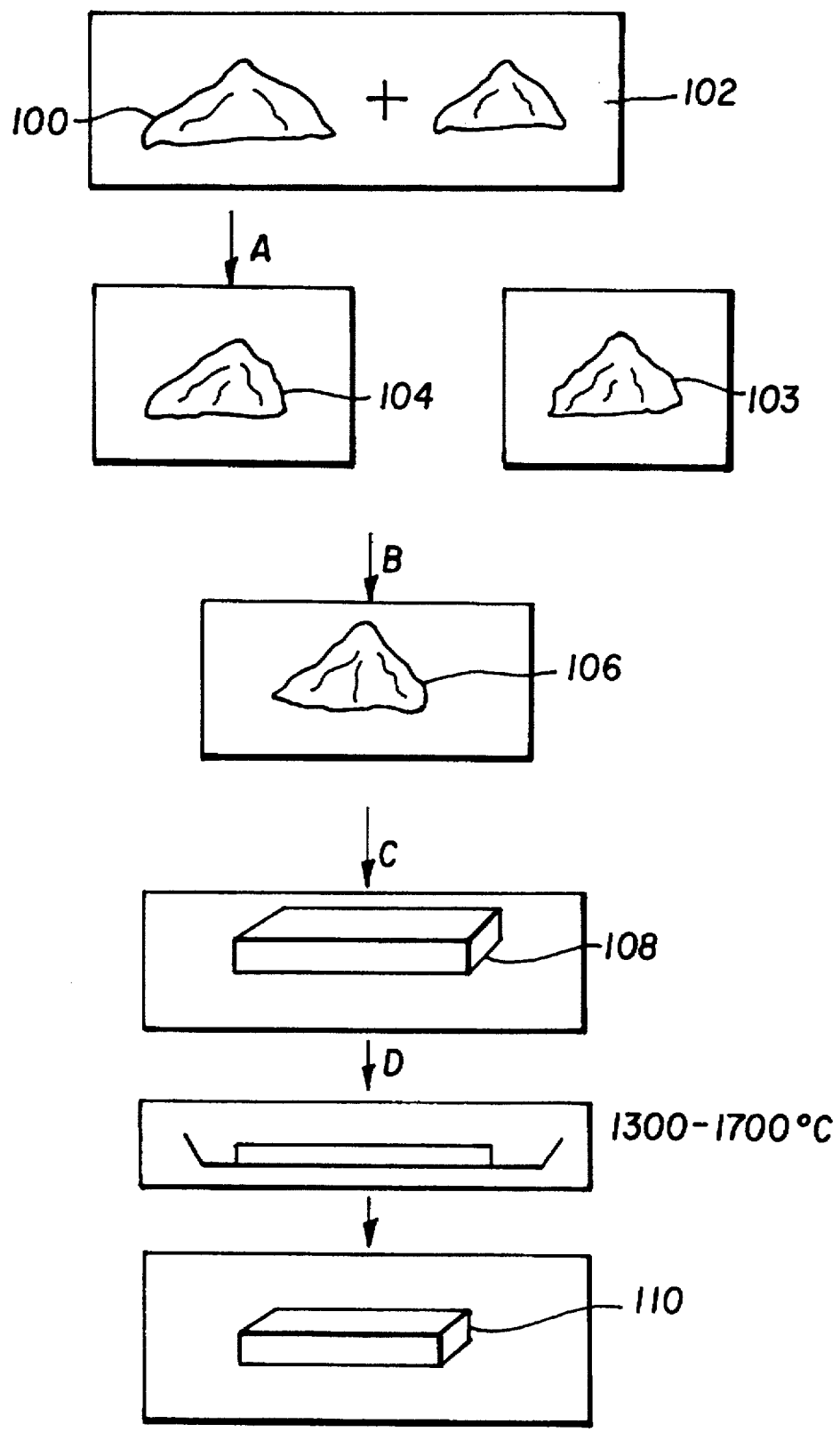
FIG. 1 is a schematic diagram of the method of the invention.

Step "A" in FIG. 1, diagrammatically illustrates the alloying process. Zirconia powder 100 is combined with one or more secondary oxide powders 102 to provide zirconia alloy powder 104. The preparation of zirconia alloys is well known to those skilled in the art and zirconia alloys are available commercially. For example, particulate zirconia alloy having 3 mole percent Y$_2$O$_3$ is marketed by Z-TECH Corporation, Bow, N.H. (presently known as HANWHA Advanced Ceramics), as "SYP-ULTRA 5.2 Yttria Stabilized Zirconia" (or as "HWA-ZY3P") and TOSHO Corporation of Japan as, "TZ-3YB".

The grain and agglomeration sizes and distributions, moisture contents, and binders (if any) can be varied in the zirconia alloy, in a manner known to those skilled in the art. "Grain" is defined as an individual crystal, which may be within a particle, having a spatial orientation that is distinct from that of adjacent grains. "Agglomerate" is defined as an aggregation of individual particles, each of which may comprise multiple grains. In a particular embodiment of the invention, the grain and agglomeration sizes and distributions, and moisture contents of the zirconia alloy are selected as if the zirconia alloy was not going to be mixed with the zirconium diboride, that is in a manner known to the art to be suitable for the preparation of a zirconia alloy article.

An example of convenient particulate characteristics for a particular embodiment of the invention is the following. Purity is preferably well controlled at 99.9 to 99.99 percent, that is, impurities are no more than about 0.1 to 0.01 percent. The grain size is from about 0.1 micrometers to about 0.6 micrometers. The average grain size is 0.3 micrometers. The distribution of grain sizes is: 5–15 percent less than 0.1 micrometers, 40–60 percent less than 0.3 micrometers, and 85–95 percent less than 0.6 micrometers. The surface area of each individual grain ranges from about 10 to about 15 m$^2$/gram or is preferably 14 m$^2$/gram. Agglomerate size is from about 30 to about 60 micrometers and average agglomerate size is 40–60 micrometers. Moisture content is about 0.2 to 1.0 percent by volume of blank and is preferably 0.5 percent. The mixture of particulates is compacted in the presence of a binder such as gelatin polyethyleneglycol (PEG), acrylic or polyvinyl ionomer or more preferably polyvinyl alcohol. The binder is added to and mixed in with the particulate mixture, for example by spraying or ball milling prior to placement of the powder mixture in a compacting device. Zirconium diboride 103 is mixed with the zirconia alloy. The method involves ball milling a sample of Tosoh TZ-3YB zirconia, (Tosoh Corporation of Japan), which is 3 mole percent yttria 102 alloyed to pure zirconia 100 to yield tetragonal ZrO$_2$, 104, and Alfa Products ZrB$_2$ 103 at concentrations of 0, 10, 25, 35 and 50 weight percent with Burundum™ milling media for three hours. The mixed composite powder 106 is then pressed uniaxially to a rectangular shape using a 1.88×0.313 inch rectangular die at 15,000 psi (12,000 to 18,000 psi range). The resulting green parts 108 were then sintered at temperatures between 1300°–1700° C. (preferably at 1500° C.) by placing them in an alumina boat using a CM tube furnace in an atmosphere of 99.99% argon at a flow rate of 1.0 to 3.0 liters/min (LPM), preferably 2 LPM.

Step "B" in FIG. 1, diagrammatically illustrates the mixing of the particulate zirconia alloy 104 and the zirconium diboride 103. The mixing can be mechanical or alternatively can be chemical, for example, mixing by coprecipitation. Alternatively, ZrB$_2$ can be mixed with zirconia-alumina (ZrO$_2$-Al$_2$O$_3$) composite by premixing TZ-3YB zirconia with 5–50 wt. % Al$_2$O$_3$ (FIG. 1 does not show this step).

The particulate mixture of zirconia alloy or zirconia-alumina composite and zirconium diboride 106 is compacted; heated to a temperature range at which sintering will occur; sintered, that is, maintained at that temperature range for a period of time; and then cooled. During all or part of sintering, the particulate mixture is in contact with 99.99% argon gas. In FIG. 1, element 108 represents the product of both mixing and compaction, indicated by arrow "C". Compaction and sintering are generally discussed herein as two consecutive operations, as indicated by "C" and "D" in FIG. 1, however, the invention is not limited to a particular sequence of compacting and sintering. For example, compaction and sintering can be simultaneous in a single operation or partial compaction can be followed by sintering and further compaction utilizing a process like hot isostatic pressing (HIP). The interim product of compacting and sintering operations or fully sintered product is referred to herein as a "blank", which is illustrated as element 110 in FIG. 1. Blank 110 is at least partially compacted and is either unsintered or not fully sintered or alternatively is fully sintered or hot isostatically pressed.

Completion of compacting and sintering provides the finished ceramic or ceramic composite articles 110, which have high sintered densities (at least greater than 90% of the theoretical) and also have high electrical conductivities.

In a preferred method of the invention, the powder is cold compacted to provide a "green preform" 108, which has a "green" density that is substantially less than the final sintered density of the ceramic article 110. It is preferred that the green density be between about 40 and about 65 percent of the final sintered density, or more preferably be about 60 percent of the final sintered density.

For a particular powder distribution, the green density is largely dependent upon the compaction pressure and the fill ratio. Preferred compaction pressures in the methods of the invention are about 10,000–30,000 psi (69–207 MPa). A more preferred compaction pressure is about 15,000 psi (about 100 MPa). The fill ratio is maintained at from about 2.5 to 1 to about 3.5 to 1. A preferred fill ratio is about 3.0 to 1. Compaction time can be readily determined by the operator depending upon the compaction pressure selected. Compaction time, for example, can be in the range of from about 60 seconds to about 10 seconds for compaction pressures in the range of about 12,000 psi to about 18,000 psi, respectively. For a compaction pressure of 15,000 psi (100 MPa), the compaction time can be 30 seconds. It is well known that the compaction pressure and time selected by the operator can be dependent upon the size of the finished part 108. Generally, as the part size increases, compaction time is increased.

The methods of the invention are limited to particular sintering pressure and temperature conditions. Sintering can be performed at atmospheric pressure or alternatively a higher pressure can be used during all or part of the sintering to reduce porosity. The sintering is continued for a sufficient time period for the shell of the article being sintered to reach a thermodynamic equilibrium structure. An example of a useful range of elevated sintering pressures is from about 69 MPa to about 207 MPa, or more preferably about 100–103 MPa. An example of a useful range of sintering temperatures is from about 1300° to about 1700° C., or more preferably about 1500° C. An example of a useful range of sintering times is from about 1 hour to about 3 hours or more preferably about 2 hours. In a particular embodiment of the methods of the invention, the sintering peak temperature is 1500° C. and that temperature is maintained for about 2 hours.

The exact manner in which the "green preforms" are sintered to produce the said electrically conductive ceramic or composite articles in this invention is not critical, however, as will be shown later in the comparative example the sintering in argon gas environment is important. It is therefore, imperative that a uniform, unobstructed flow of argon gas surrounds the "green preforms".

It is preferred that the sintered blank be slowly heated to sintering temperature and slowly cooled so as to avoid undesirable dimensional changes and crack development. In an embodiment of the invention having a preferred sintering temperature of 1500° C., preferred temperature ramps during heating are: about 0.3° C./minute for room temperature to about 300° C., about 0.1° C./minute for about 300° C. to about 400° C., about 0.4° C./minute for about 400° C. to about 600° C., and about 1.5° C./minute for about 600° C. to about 1500° C. Preferred temperature ramps during cooling are: about 2° C./minute for about 1500° C. to about 800° C. and about 1.6° C./minute for about 800° C. to room temperature.

Figure 2:
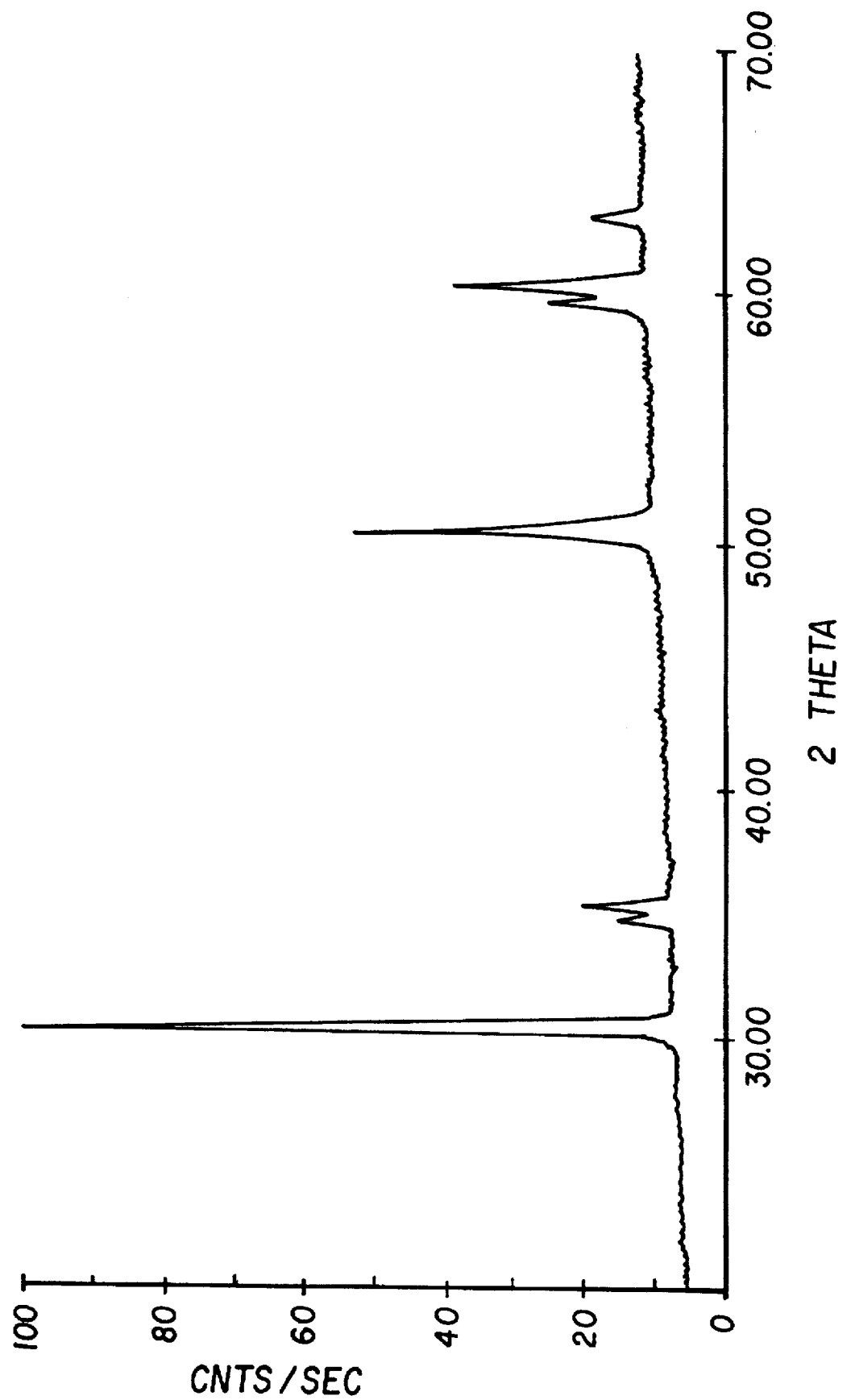
FIG. 2 shows X-ray diffraction data of an article showing the presence of predominately tetragonal phase.
Figure 3:
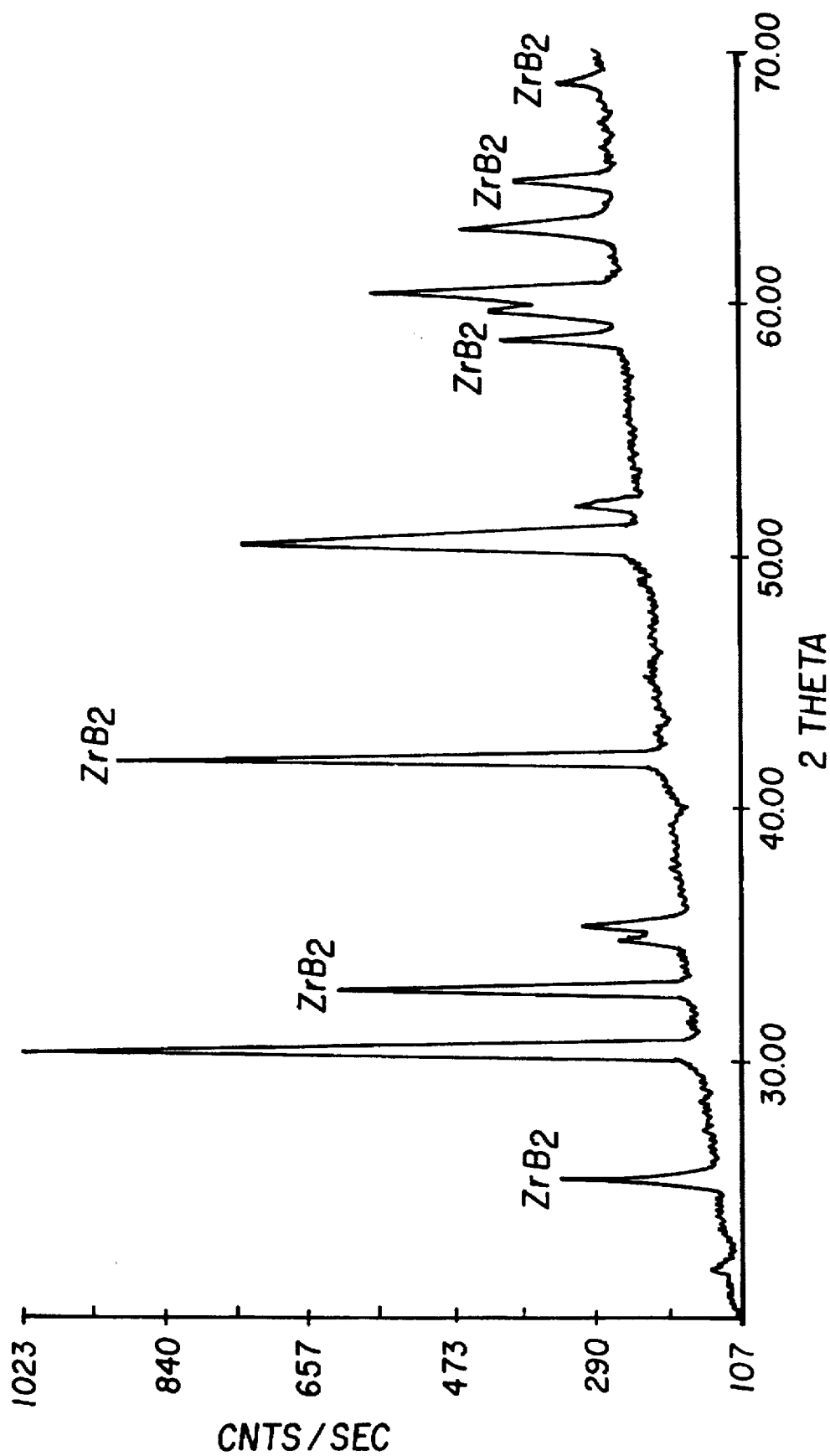
FIG. 3 shows X-ray diffraction data of an article showing the presence of both tetragonal zirconia phase and zirconium diboride phase.

The crystalline structures of the sintered samples are determined using a Phillips X-ray diffractometer. Typical x-ray diffraction patterns are illustrated in FIGS. 2 and 3. Bulk electrical conductivity for each sintered sample 110 were then determined using a Veeco FPP 5000 four point probe. Working examples and comparative examples of various ceramic composite compositions along with their experimental results are summarized in Table 1.

TABLE 1

Examples

| Examples | Material | Crystal Phase by XRD | Density, (g/cc) | Fracture Toughness, (MPa√m) | Resistivity through bulk (Ω/(sq.) |
|---|---|---|---|---|---|
| Comparative Example 1 | TZ-3YB sintered in air | Tetragonal $ZrO_2$ | 99.9% of theoretical | 6.0 to 7.5 | Very High |
| Comparative Example 2 | TZ-3YB sintered in Argon gas | Tetragonal $ZrO_2$ | 93.0% of theoretical | 4.63 | Very high |
| Comparative Example 3 | 85 wt. % TZ-3YB + 15 wt. % $ZrB_2$ sintered in Argon gas | Tetragonal $ZrO_2$ + weak $ZrB_2$ | 92.8% of theoretical | not determined | Very high |
| Comparative Example 4 | 75 wt. % TZ-3YB + 25 wt. % $ZrB_2$ sintered in Argon gas | Tetragonal $ZrO_2$ and strong $ZrB_2$ | 92.5% of theoretical | not determined | High |
| Example 5 | 65 wt. % TZ-3YB + 35 wt. % $ZrB_2$ sintered in Argon gas | Tetragonal $ZrO_2$ and strong $ZrB_2$ | 92.1% of theoretical | 4.84 | 0.000586 (low) |
| Example 6 | 50 wt. % TZ-3YB + 50 wt. % $ZrB_2$ sintered in Argon gas | Tetragonal $ZrO_2$ and strong $ZrB_2$ | 92.0% of theoretical | not determined | 0.000517 (low) |

From the working examples it is concluded that the effective composition range for the conductive ceramic and conductive ceramic composites is from 30 to 50 wt. % $ZrB_2$. Beyond 50 weight % $ZrB_2$ compositions the ceramic or ceramic composites are conductive but the crystal structures of zirconia is not essentially tetragonal.

The lower densities of the samples sintered in argon gas is due to incomplete combustion of the binders, which were added to the particulate systems. The decrease in fracture toughness is also thought due to lower densities of the articles.

These composites can be hot isostatically pressed to achieve near 100% of theoretical density and improve the fracture toughness without degrading the electrical conductivity, as hot isostatic pressing is done in an argon atmosphere. In these examples the composites had only two distinct phases, tetragonal $ZrO_2$ and $ZrB_2$, in various proportions, depending on their compositions, resulting in superior electrical properties.

Typical x-ray diffraction data showing the presence of essentially only tetragonal $ZrO_2$ phase is shown in FIG. 2 for samples in comparative examples 1, 2 and 3 and presence of $ZrB_2$ and tetragonal $ZrO_2$ in working example 5 are presented in FIG. 3.

The methods of the invention are applicable to the production of a variety of articles, particularly cutting tools and abrasion and wear resistant machine parts, in that many tools have a longer service life. Examples of tools include slitter knives, punches and dies for cloth, cardboard, metal, polymeric materials and for paper coated with abrasive material such as silver halides and the like, specifically films for advanced photo systems (APS).

The electrical conductivity helps tribo-electric discharge in an application where moving polymeric materials come in contact with conveyance rollers, for transporting photographic film base or papers. Bulk electrical conductivity also makes it possible to cost-effectively machine intricate shape with very high dimensional accuracy using EDM.

EDM is a process of precise machining of intricate shape carried out by electrical discharge of sparks between the part to be machined and to the electrode in the form of either master tool or wire which is guided by the numerical control of the EDM machine. For electro-discharge machining (EDM) to be effective, it is imperative that the part to be machined is electrically conductive to sustain the electrical sparks between the electrode and the work piece.

Machining experiments using the articles of working example 5 were carried out using an electro-discharge machine (Charmilles-D-20 Isocut, Switzerland). The cut quality, ease of cutting, surface finish, burn zone width and the degradation of electrodes were found to be comparable to or better than that of steel and cemented tungsten carbides.

While the invention has been described with particular reference to a preferred embodiment, it will be understood by those skilled in the art the various changes can be made and equivalents may be substituted for elements of the preferred embodiment without departing from the scope of the invention. In addition, many modifications may be made to adapt a particular situation in material to a teaching of the invention without departing from the essential teachings of the present invention.

We claim:

1. An electrically conductive ceramic article comprising a composite of a) from 70 to 50 weight percent of 100% tetragonal zirconia alloy or composite of 100% tetragonal zirconia-alumina and b) from 30 to 50 weight percent zirconium diboride.

2. The article of claim 1 comprising from 70 to 50 weight percent $ZrO_2$ alloy and from 30 to 50 weight percent $ZrB_2$.

3. The article of claim 1 comprising a $ZrO_2$-$Al_2O_3$ composite wherein $Al_2O_3$ is from 5 to 50 weight percent of the total $ZrO_2$-$Al_2O_3$ composite and from 30 to 50 weight percent $ZrB_2$.

4. The article of claim 1 consisting essentially of particulate sintered zirconium oxide alloy and $ZrB_2$, said particulate zirconium oxide alloy having an elemental composition consisting essentially of Zr, O and at least one element from the group consisting of oxides of Mg, Ca, Y, Sc, Ce and rare earth elements, said particulate zirconium oxide alloy being 100% tetragonal crystal structure.

5. The article of claim 4 wherein the zirconium oxide is doped with from 0.5 to 5 mole percent yttria.

6. The article of claim 5 wherein the zirconium oxide is doped with 3 mole % yttria.

7. The article of claim 1 shaped by electro-discharge machining into a conveyance roller.

8. The article of claim 1 shaped by electro-discharge machining into guide rails.

9. The article of claim 1 which is electrodischarge machinable.

10. The article of claim 1 shaped by electro-discharge machining into a slitter knife.

11. The article of claim 1 shaped by electro-discharge machining into a film perforating punch.

* * * * *